United States Patent [19]

Ecsedy

[11] 3,968,062

[45] July 6, 1976

[54] USE OF PARA-TERT. BUTYL PHENOL DISULFIDE FOR VULCANIZING CHLOROBUTYL RUBBER COMPOSITIONS

[75] Inventor: Robert N. Ecsedy, Newtown, Conn.

[73] Assignee: Fairfield Chemical Services, Westport, Conn.

[22] Filed: Aug. 23, 1974

[21] Appl. No.: 499,886

[52] U.S. Cl.................................. 260/5; 260/48; 260/79.5 C; 260/79.5 A; 260/137; 260/888
[51] Int. Cl.² ...................... C08L 7/00; C08L 9/00; C08L 23/22
[58] Field of Search..................... 260/4 R, 5, 888

[56] References Cited
UNITED STATES PATENTS

| | | | |
|---|---|---|---|
| 2,422,156 | 12/1947 | Wolf et al. | 260/79.5 |
| 3,508,595 | 4/1970 | Wilson | 260/5 |
| 3,630,974 | 12/1971 | Ladocsi | 260/888 |

*Primary Examiner*—John C. Bleutge
*Attorney, Agent, or Firm*—Kaufman & Kramer

[57] ABSTRACT

An improved process for preparing chlorobutyl rubber compositions employs, as curing agent, para-tert. butyl phenol disulfide having a sulfur content in excess of about 27 wt% and a softening point not less than 80°C. Para-tert. butyl phenol disulfide is a solid substance which, unlike other commercially employed alkyl phenol sulfides, is a non-tacky brittle solid which does not deteriorate as by coalescing under normal storage conditions.

6 Claims, No Drawings

3,968,062

USE OF PARA-TERT. BUTYL PHENOL DISULFIDE FOR VULCANIZING CHLOROBUTYL RUBBER COMPOSITIONS

BACKGROUND OF THE INVENTION

This invention relates to an improved process for vulcanizing chlorobutyl rubber compositions containing natural and/or synthetic rubber. It also pertains to vulcanizable rubber compositions prepared by this process and the resultant vulcanizates. More particularly, the invention relates to the use of a specific alkyl phenol sulfide, namely, para-tert. butyl phenol disulfide, as a component of the vulcanizing system for chlorobutyl rubber compositions. It relates still further to the resultant vulcanizable compositions and the vulcanizates producible therefrom.

The use of alkyl phenol sulfides as vulcanizing agents for butadiene polymers is well known. For example, Wolf et al in "Alkylphenolsulfides as Vulcanizing Agents", *Industrial J Engineering Chemistry* 38, 1157 (1946), and Wolf et al U.S. Pat. 2,422,156 (1947) teach the use of alkyl phenol sulfides as curing agents for butadiene polymers such as chloroprene, isoprene and copolymers of 1,3-butadiene with styrene, acrylonitrile and other polymerizable olefins. Extensive investigations at that time led to the recognition that certain para-tert. alkyl phenol disulfides were preferred vulcanizing agents for synthetic butadiene-styrene rubbers (GR-S). This discovery resulted from efforts to find materials which would function as effective tackifiers between the elastomer and the non-rubber components; it was necessary to find such tackifiers in order for the butadiene-styrene rubber to be useful in pneumatic tires.

In U.S. Pat. No. 2,422,156, the patentees point out that a wide variety of possible para-tert. alkyl phenol sulfides can be prepared according to the general reaction scheme:

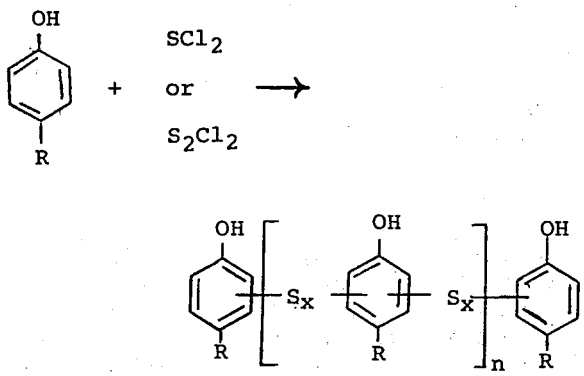

R can be a tert. alkyl group from 4 to about 10 carbon atoms. The symbol $x$ can be 1, 2 or a higher number, depending upon how much sulfur was introduced in the reaction. Using sulfur dichloride according to the above indicated scheme, $x$ would be 1; using sulfur monochloride, $x$ would be 2. If a tri - or higher sulfide is desired, the product can be further reacted with elemental sulfur. The repeating unit $n$ can be 0, 1, 2 or a higher digit, and would depend upon the ratio of the reactants used. As employed in the instant specification, the term, "para-tert. alkyl disulfide" refers to compounds in which $x$ is 2. The terminology respecting the various alkyl sulfides, the method of preparation and significant background material may be found in U.S. Pat. No. 2,422,156, the disclosure of which is hereby incorporated by reference.

The Wolf et al article entitled "Alkylphenolsulfides as Vulcanizing Agents", referred to above discusses at length the relationship between tack and vulcanizing ability. It was concluded therein that, with respect to butadiene-styrene copolymers, the preferred alkyl phenol sulfides are disulfides in which, in the above reaction scheme, R has from 4 to 6 atoms and in which the sulfur content of the product ranges from about 20 to about 30 wt.%

The most readily available para-tert. alkyl phenol disulfides were the para-tert. amyl phenol disulfides which could be readily prepared from para-tert. amyl phenol. Two principal commercial products have been introduced, Vultac 2, containing 23% sulfur, and Vultac 3, containing 28% sulfur. The exact structure of these products is not known; it is believed that they are complex mixtures of polysulfides. They are generally referred to in advertising and literature as simply "alkyl phenol disulfides". The terminology is, unfortunately, somewhat misleading in that the products consist principally of compounds having tert. amyl groups and they do not contain any compounds with a tert. butyl group. The Vultac alkyl phenol disulfides appear to have been developed not only as vulcanizing agents (i.e., as a replacement for sulfur), but also as tackifying agents. These commercial alkyl phenol disulfides, which are composed primarily of tert. amyl phenol disulfides, are themselves tacky substances and are therfore quite suitable as tackifying agents in styrene-butadiene rubber compositions. For these and other reasons, they have also found utility in other rubber compositions such as natural rubber and nitrile-butadiene rubbers.

The use of undiluted commercially available alkyl phenol disulfides presents some rather difficult problems in handling. These products have a tendency to coalesce when stored in containers at ambient temperatures. The result is a fused product which presents an extremely difficult problem upon attempts at removal and handling. Efforts to solve this handling problem have led to the development of diluted alkyl phenol disulfide products. For example, the para-tert. amyl phenol disulfide product, Vultac 2, has been fused with about 30% of stearic acid to give a hard wax-like product. This diluted product, sold under the trademark Vultac 4, is considerably easier to remove from a storage container than corresponding undiluted product Vultac 2, but is still not entirely satisfactory. At room temperature, sharp tools are required to remove the product from its container. Preferably, the product is heated to its softening range of about 48°–58°C., thus facilitating removal. This is not, however, a convenient procedure for modern automated rubber manufacturing plants which would prefer to employ a free-flowing powder. Furthermore, since the diluted product contains only 16% sulfur, added processing expenses arise from the fact that more product must be used.

A para-tert. amyl phenol disulfide having 28% sulfur (Vultac 3) is available commercially. This product which is tacky, is also available in a diluted form containing about 30% of Micro-Cel E (a very fine absorptive and porous synthetic calcium silicate) and is sold under the name Vultac 5. It is a chemically and physically stable powder which does not coalesce below 71°C. As with the previously described amyl phenol disulfide product, i.e. Vultac 4, rubber product manufacturers incur additional expense because the sulfur is considerably below the 28% value for the corresponding undiluted form. Furthermore, the product is extremely dusty and its use requires the employment of dust control facilities. One of the more serious objections to the use of this material is the frequent difficulty in obtaining a good dispersion which is a requirement for any rubber additive in order to produce high quality products.

In the 1950's, butyl rubbers were modified notably by addition of small amounts of halogen atoms, notably chlorine and bromine, to the polymer chain. Chlorinated butyl rubber, also known as chlorobutyl rubber, possesses many advantageous properties, such as resistance to environmental attack and low permeability to gases. Futhermore, it is extremely compatible with highly unsaturated elastomers to produce co-vulcanizates using known vulcanizing agents. Further information concerning the properties, characteristics and chemistry of vulcanization of chlorobutyl rubber may be found in Baldwin et al, "Preparation and Properties of Chlorobutyl", *Rubber and Plastics Age* 42, 500 (1961) the pertinent portions of which are incorporated herein by reference.

Chlorobutyl rubber contains allylic chlorine atoms which are easily removed by chemical reaction and thus afford additional cross-linking sites. The commercially available alkyl phenol disulfides which, as noted above, are composed primarily of tert. amyl phenol disulfides, were found to be good auxiliary cross-linking agents for chlorobutyl rubber. This was not a completely expected phenomenon, because the same commercial alkyl phenol disulfides shows no utilization in brominated butyl polymers. One of the advantages possessed by chlorinated butyl rubbers is that they are themselves tacky and need no additional tackifer. Thus, with chlorobutyl rubber, the use of the commercial para-tert. amyl phenol disulfide compositions serves only the single purpose of vulcanization. This is in contrast to both the early and current styrene-butadiene rubber compositions in which the alkyl phenol disulfides serve as both a vulcanizing agent and as a tackifier. All that is required for chlorobutyl rubber is a vulcanizing agent, but, in order to get this vulcanizing ability, it has been necessary to employ substances which are needlessly inconvenient for use.

It is therefore a principal object of this invention to provide a vulcanizing agent for use in chlorobutyl rubber which would have vulcanizing properties comparable to those of the commercially available para-tert. amyl phenol disulfides but which would be easier to handle.

It is a further object of this invention to provide such vulcanizing agents in easily handled form without the necessity of dilution with inert material.

Further objects will become apparent from the following discussion of the invention.

SUMMARY OF THE INVENTION

According to this invention, blends of chlorobutyl rubber with other elastomers are vulcanized by the use of para-tert. butyl phenol disulfide as an auxiliary vulcanizing agent where said disulfide contains from about 27 to about 29 wt. % of sulfur. Higher sulfides containing sulfur over and above the theoretical maximum 30 wt. % of the disulfide may be used in this invention but serves no useful purpose because when extra sulfur is required, it is preferably added separately. The invention also comprises an improved process for manufacturing synthetic rubber compositions containing chlorobutyl rubber which are cured with para-tert. butyl phenol disulfide containing from about 24 to about 29 wt. % of sulfur.

The para-tert. butyl phenol disulfides are used along with accelerators and/or co-vulcanizing agents to form an effective vulcanizing system. Among the useful accelerators are MBTS (benzothiazyl disulfide) TMTMS (tetramethyl thiuram monosulfide) and DETU (diethyl thiourea). Among the co-vulcanizing agents are phenol formaldehyde resins such as Amberol ST-317X or Amberol ST-140F, and alkyl phenol disulfides.

The para-tert. butyl phenol disulfide is a solid, non-tacky product, which presents no problem in handling. Thus, it is not necessary to dilute the compound with solid carrier materials and the problems resulting from such dilution are not encountered.

Para-tert. butyl phenol disulfide is produced by the reaction of para-tert. butyl phenol with sulfur monochloride. When the reaction is carried out using approximately 11:10 moles of phenol to monochloride, the para-tert. butyl phenol disulfide will have about 28% by weight of sulfur and a softening part of approximately 90°–105°C. The para-tert. butyl phenol is produced by the reaction of isobutylene and phenol according to the following scheme:

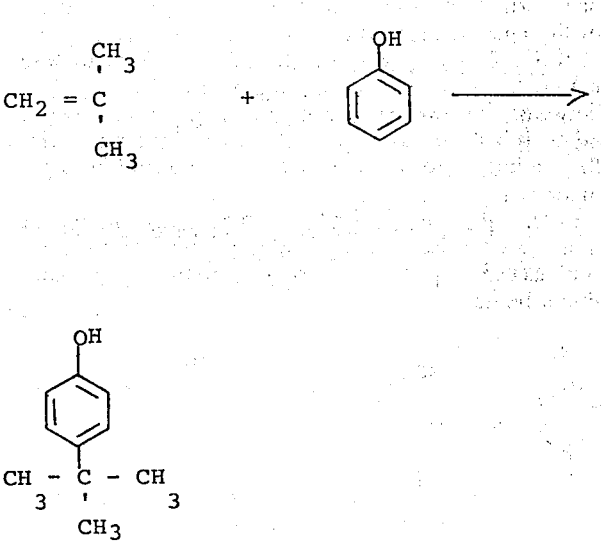

The resulting para-tert. butyl phenol disulfide is a clear, amber, brittle resin which shows no evidence of tackiness. The product is produced as a substantially pure, extremely friable material. It shatters quickly and easily to a fine powder on the application of moderate pressure to a small sample held between the fingers. This is in contrast to para-tert. amyl phenol disulfides which are mixtures of isomers and do not show similar behavior; instead, they can be fractured only with difficulty and the resultant crushed product consists of gummy or tacky discrete particles. The ability of para-tert. butyl phenol disulfide to shatter indicates that the material is ideally suited for us in rubber compounding since an optimum dispersion thereof can be obtained in rubbers where the normal shearing action during milling or mixing would be adequate to obtain the necessary particle size reduction.

In further contrast to para-tert. amyl phenol disulfides, when para-tert. butyl phenol disulfide is melted and then cooled to room temperature, it shatters easily. There is no tendency for a film of the compound to adhere to the vessel but, rather it is self-releasing and is cleanly and completely removed from metal surfaces with little or no effort. The resulting flakes do not coalesce. This was demonstrated by heating samples of such para-tert. butyl phenol disulfide flakes for periods of up to 250 days at 175°F. without any visual evidence of change.

The para-tert. butyl phenol disulfide used in the methods and compositions of this invention contains from about 27 to about 29 wt.% — preferably about 28 wt.% — of sulfur. The fact that this product contains a higher percentage of sulfur than, for example, Vultac 2, Vultac 4 and Vultac 5, is economically advantageous. It has, however, been observed, that para-tert. butyl phenol disulfides having a lower sulfur content, e.g., 23 percent, does not possess the same advantageous handling qualities. Para-tert. butyl phenol disulfide having 23 wt.% of sulfur was prepared but, upon heating and subsequent cooling, it was not brittle enough to flake. Furthermore, in storage some coalescence was observed, presumably because it is less highly polymerized.

The use of para-tert. butyl phenol disulfide having about 27 to about 29 wt.% sulfur as a curing agent for chlorobutyl rubber compositions results in two important economic and technical advantages. First, a non-dusting, storage-stable, easily handled curing agent is available. Secondly, when this curing agent was evaluated in a number of chlorobutyl rubber recipes using conventional mixing equipment such as a two-roll mill or a Banbury, it disintegrated and dispersed uniformly and rapidly upon addition, thus once again demonstrating its unique friability.

After curing, the physical properties of the resulting vulcanizates were indistinguishable from the control compound which contained an equivalent active amount of the commercially available "alkyl phenol disulfide" generally recommended and used.

The following examples are presented to further illustrate this invention. Parts are used by weights, unless otherwise indicated.

EXAMPLE 1

PREPARATION OF POLYMERIC PARA TERT. BUTYL PHENOL DISULFIDE

In a 500-ml. flask fitted with an agitator, separatory funnel, condenser, and thermometer is placed 165 g. (1.1 mols) of p-t-butyl phenol. The addition of approximately 50 ml. of a low boiling solvent such as trichloroethylene is also desirable to return any phenol to the flask that may sublime during the subsequent reaction. By means of a heating mantle, the temperature is brought to 115°–130°C. at which time 135 g. (1.0 mol) of sulfur monochloride is added dropwise to the stirred mixture. The hydrogen chloride which is evolved continuously through the condenser can be absorbed in water or any suitable alkaline solution. During the course of addition of sulfur chloride and as the reaction mixture becomes more viscous, the temperature is slowly and steadily increased to 140°–155°C. in order to facilitate agitation. When all the sulfur chloride is added, heating is continued for about an hour to complete the reaction and remove all the traces of hydrogen chloride. After removing the solvent by distillation, the remaining hot molten mass is poured into a pan. After cooling, the dark, amber, brittle resinous product weighs 225 g. (yield 99 per cent), contains approximately 28 per cent sulfur and has a softening point of 90°–105°C.

EXAMPLE 2

CHLOROBUTYL BLACK INNERLINER FOR PASSINGER TIRES

| | |
|---|---|
| ENJAY BUTYL 10–68 | 65 |
| Natural Rubber (no. 1 Smoked Sheet) | 25 |
| Whole tire reclaim | 20 |
| GPF Carbon Black | 70 |
| Paraffinic Oil | 12.5 |
| Stearic Acid | 1 |
| Amberol ST-317X | 4 |
| Maglite K | 0.5 |
| Zinc Oxide | 5.0 |
| TMTMS | 0.25 |
| Para-tert. butyl phenol disulfide | 0.5 |
| MBTS | 1.25 |
| Permeability, Q × 10[3(a)] | |
| Tested at 150°F | 6.8 |
| Adhesion to SBR-NR Carcass Stock | |
| Cured 45 minutes at 287°F | |
| Pulled at a rate of 2 in./min | |
| Tested at 75°F, lb/in | 48 |
| Tested at 250°F, lb/in | 24 |

[(a)]Q-cubic feet of air (at 32°F and 29.92 in Hg) diffusing through 0.001 in. of material under pressure differential of 1 psi/sq ft/day.

EXAMPLE 3

INNERLINER, 60 DUROMETER

| | |
|---|---|
| CHLOROBUTYL HT 10–68 | 65 |
| No. 1 R.S.S. (Premasticated Natural Rubber) | 25 |
| Whole Tire Reclaim | 20 |
| HAF-LS Black | 40 |
| Whitetex Clay | 40 |
| Flexon 840 Oil | 10 |
| Amberol ST 140F | 4 |
| Stearic Acid | 1 |
| Zinc Oxide | 5.0 |
| Dibenzo GMF | 0.25 |
| MBTS | 1.25 |
| Para-tert. Butyl phenol Disulfide | 0.35 |
| TMTMS | 0.25 |
| Specific Gravity | 1.25 |
| | |
| PROCESSIBILTY PROPERTIES | |
| Mooney Scorch at 270F (MS), t$_3$, mins | 9 |
| Mooney Viscosity, ML (1+8) 212, units | 52 |
| | |
| PHYSICAL PROPERTIES, Press Cure: 30 Mins at 307F | |
| Hardness Points | 60 |
| 300% Modulus, psi | 740 |
| Tensile Strength, psi | 1450 |
| Ultimate Elongation, % | 580 |

EXAMPLE 4

RADIAL TIRE INNERLINER, 50 DUROMETER

| | |
|---|---|
| CHLOROBUTYL HT 10–68 | 70 |
| No. 1 R.S.S. (Premasticated Natural Rubber) | 30 |
| Maglite K | 0.5 |
| Regal 300 Black | 25 |
| MT Black | 75 |
| Sunolite 127 Wax | 3 |
| Stearic Acid | 1 |
| Zinc Oxide | 5.0 |
| MBTS | 0.75 |
| Para-tert. butyl Phenol Disulfide | 1.08 |
| Specific Gravity | 1.24 |
| | |
| PROCESSIBILITY PROPERTIES | |
| Mooney Scorch at 270F (MS), t$_{10}$mins | 12 |
| Mooney Viscosity, ML (1+8) 21 212Funits | 69 |
| | |
| PHYSICAL PROPERTIES, Press Cure; 30 mins at 307F | |
| Hardness Points | 54 |
| 300% Modulus, psi | 1060 |
| Tensile Strength, psi | 1350 |
| Ultimate Elongation, % | 480 |
| | |
| Strip adhesion to SBR/NR carcass, lbs/in | |

EXAMPLE 4-continued

RADIAL TIRE INNERLINER, 50 DUROMETER

| | |
|---|---|
| at 200°F | 98 |

EXAMPLE 5

WHITE SIDEWALL

| | BA515Z |
|---|---|
| CHLOROBUTYL HT 10–66 | 20 |
| Vistalon (R) 2504 | 20 |
| No. 1 Pale Crepe (natural Rubber) | 40 |
| SBR 1502 | 20 |
| Titanox AWD | 30 |
| Nulok 321 | 30 |
| Stearic Acid | 1 |
| Sunolite 240 Wax | 1.5 |
| Ultramarine Blue | 0.2 |
| Zinc Oxide | 10.0 |
| Sulfur | 0.5 |
| Para-tert. butyl Phenol Disulfide | 1.08 |
| MBTS | 0.75 |

PROCESSIBILITY PROPERTIES

| | |
|---|---|
| Mooney Scorch at 270F (MS), $t_{10}$ mins | 12 |

PHYSICAL PROPERTIES, Press Cure: 30 Mins at 307F

| | |
|---|---|
| Hardness, Points ) | 48 |
| 300% Modulus psi ) | 850 |
| Tensile Strength, psi ) | 1850 |

EXAMPLE 5-continued

WHITE SIDEWALL

| | |
|---|---|
| Ultimate Elongation ) | 550 |

What is claimed is:

1. A method of vulcanizing blends of chlorobutyl rubber with at least one other highly unsaturated elastomer capable of producing a co-vulcanizate with chlorobutyl rubber which comprises mixing said chlorobutyl rubber blends with a vulcanizing agent comprising a friable resinous para-tert-butyl phenol disulfide containing 27 – 29 percent sulfur and vulcanizing the resultant mixture.

2. A vulcanizable composition comprising a blend of chlorobutyl rubber with at least one other highly unsaturated elastomer capable of producing a co-vulcanizate with chlorobutyl rubber and a vulcanizing agent comprising para-tert. butyl phenol disulfide containing about 28 wt. percent sulfur.

3. A method according to claim 1 in which the para-tert. butyl phenol disulfide has about 28 wt. % of sulfur.

4. A method according to claim 1 in which the para-tert. butyl phenol disulfide is in flake form.

5. A composition according to claim 2 in which the para-tert. butyl phenol disulfide present in combination with a member selected from the group consisting of benzothiazyl disulfide, tetramethyl thiuram monosulfide and diethyl thiourea.

6. The vulcanizate of claim 2.

* * * * *